(12) United States Patent
Hayes

(10) Patent No.: US 7,398,220 B1
(45) Date of Patent: Jul. 8, 2008

(54) INTERNET INSURANCE CERTIFICATE SYSTEM

(75) Inventor: Francis E. Hayes, Boston, MA (US)

(73) Assignee: Certificate Exchange LLC, Boston, MA (US)

( * ) Notice: Subject to any disclaimer, the term of this patent is extended or adjusted under 35 U.S.C. 154(b) by 787 days.

(21) Appl. No.: 09/706,101

(22) Filed: Nov. 3, 2000

Related U.S. Application Data

(60) Provisional application No. 60/163,615, filed on Nov. 4, 1999.

(51) Int. Cl.
*G06Q 40/00* (2006.01)

(52) U.S. Cl. ............................................. 705/4; 705/1

(58) Field of Classification Search ............ 705/1, 705/4; 283/54
See application file for complete search history.

(56) References Cited

U.S. PATENT DOCUMENTS

| | | | | |
|---|---|---|---|---|
| 4,831,526 | A * | 5/1989 | Luchs et al. | 705/4 |
| 6,272,482 | B1 * | 8/2001 | McKee et al. | 706/47 |
| 6,526,386 | B1 * | 2/2003 | Chapman et al. | 705/4 |
| 6,694,315 | B1 * | 2/2004 | Grow | 707/10 |
| 2002/0022976 | A1 | 2/2002 | Hartigan | 705/4 |
| 2002/0198745 | A1 * | 12/2002 | Scheinuk et al. | 705/4 |

OTHER PUBLICATIONS http://web.archive.org/web/*/http://www.acords.com, Website of Choices via http://www.archive.org, pages from Feb. 3, 1999 and Dec. 2, 1998.*

Malecki, Insurance certificates, Dec. 1997, Rough Notes, vol. 140 No. 12, pp. 70-71.*

Hale, Greater productivity equals greater profitability, Jun. 1999, American Agent & Broker, vol. 71 No. 6, pp. 40-46.*

Hancock, Automation vendors trek further into cyberspace, Nov. 1998, American Agent & Broker, vol. 70 No. 11, pp. 32-46.*

Leming, Chubb lets shippers review, download certificates online, Aug. 1999, Journal of Commerce, p. 8.*

* cited by examiner

*Primary Examiner*—Robert W Morgan
(74) *Attorney, Agent, or Firm*—Weingarten, Schurgin, Gagnebin & Lebovici LLP

(57) ABSTRACT

A system and method for issuing insurance certificates through a Web site using a single database of certificate information for both issuers and receivers of certificates. Interfaces and features are provided for Certificate Holders, Producers, Insurers, and Insured, and for parties who may receive large numbers of certificates. Control and security features enable a Certificate Holder to obtain certificates directly from the disclosed Web site in a manner that is consistent with information entered by a Producer associated with the Insured. The levels of security and control may be tailored to individual Insured parties, and/or to specific types of coverage to be listed on the resulting certificates. Producers may further indicate appropriate approval processes to be imposed on certificate requests for individual insured parties, and/or to specific types of coverage to be certified. The certificate information database maintained by the disclosed system is advantageously accessible to parties that are involved in either incoming or outgoing certificates.

6 Claims, 18 Drawing Sheets

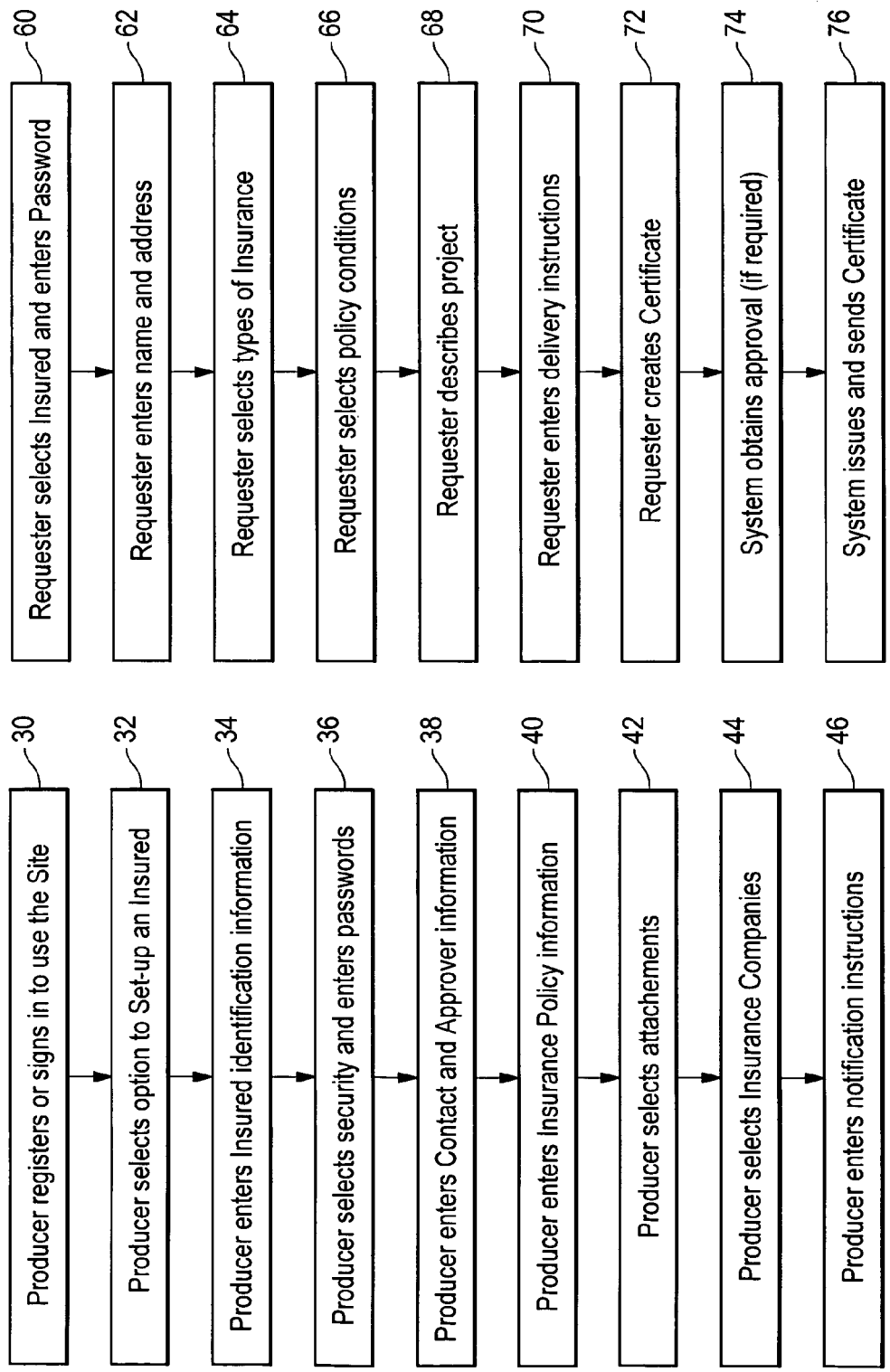

Help

Producer Sign In

| Click here if you are creating a new account | —154

Or, if you have an account, please enter your user ID and password, below.

User ID: [ ] —150

Password: [******] —152

| Cancel (Home Page) |                    | Sign In |

Help

Producer:

Producer Options
Select an option below:

162—

| Set-up insured |            | Certificate reprint |
| Revise insured |            | Create attachment |
| Revise producer |           | Password maintenance |

| Return to Home Page |

```
                                                    ┌──────┐
                                                    │ Help │
                                                    └──────┘
                          ←─170
```

Producer:

Set-up Insured

Name: [          ]
Holding Company: [(none) ▼]
Address 1: [          ]
Address 2: [          ]        } 172
City: [          ]
State/Province: [   ▼]   Zip/Postal: [   ]
Country: [          ]
Contact (First name): [     ]   (Last name): [     ]
Phone: [          ]             Fax: [          ]
E-mail: [          ]

Enter the minimum and maximum number of days of cancellation allowed to notify the Certificate Holder.
minimum [ 10 ]    maximum [ 30 ]

☑ Allow the removal of the words "Endeavor To" from cancellation clause. —174
☐ Allow inclusion of attachments with this Insured's certificates. —176

*FIG. 7*

There are four levels of security to be selected. For Insureds with a large volume of certificates, we strongly recommend the first level be selected for general certificates. You can select an alternative level later for more sophisticated certificates. The levels are:

182 — ⦿ Unsecured and open to the general public. This is for an insured with a large volume of certificates and certificates that are routine and do not convey any or limited rights to the Certificate Holder.

184 — ○ Password required to enter the system. Either the producer or Insured will provide the password to the Certificate Holder. Enter this password in the first password field, below.

186 — ○ Approval required. No password required, but the Certificate Holder will not receive the certificate until it is approved by either the first or second contact, as established below. After the Certificate Holder enters the information, the system will e-mail the contacts for approval.

188 — ○ Password and approval required.

190 — Enter a password that the Insured and Broker will provide to someone who requests a certificate: _____

192 — Enter a different password to be used only by the Producer to produce unique certificates: _____

Enter a different password to be used only by the Insured to obtain reports: _____ — 194

The contacts below are typically Producer contacts. Some may want the Certificate Holder to call or e-mail the Insured and if so, Insured contacts are also acceptable. They will be displayed on the screen when the Certificate Holder uses Certificate Exchange should the Certificate Holder have a question. They will also be used in the approval process if security option 3 or 4 (above) is selected.

First Contact  212

First Contact  214

Name
E-mail
Phone
Fax

○ Display name in the Producer's box on the printed certificate.
○ Display name in the Insured's box on the printed certificate.
● Do not display this name.

} 216

210

Cancel (Home Page)

< Prev    Next >

*FIG. 9*

|                                         | Help |
|-----------------------------------------|------|

Insured:

Set-up Insured, Policy Data  — 220

General Liability    222
☑ Commercial General Liability
☑ Occurrence
☐ Claims Made
☐ Owners' and Contractors' Protection
☐ [                    ]
☐ [                    ]

General Aggregate Limit applies per:
◉ Policy    ○ Project    ○ Location    ○ None

| | | |
|---|---|---|
| Policy number | Each occurrence | 1,000,000 |
| Effective (mm/dd/yyyy) | Fire damage | |
| Expiration (mm/dd/yyyy) | Medical expense | |
| | Personal and advertising agg. | 1,000,000 |
| | General aggregate | 1,000,000 |
| | Products and comp. oper agg. | 1,000,000 |

The system has preferred wording for General Liability Additional Insureds; however, it can be overidden. The preferred wording is: ABC Corporation (the Certificate Holder) *is added as an Additional Insured for General Liability, but only with respect to operations performed on their behalf d due to the negligence of* XYZ Corporation (the Insured).
Enter wording to override the perferred wording. Please keep in mind the sentence begins with the Certificate Holder and ends with the Insured.

is added as an Additional Insured for General Liability, but only with respect to operations performed on their behalf and due to the negligence of       — 224

Approval Required. All the check boxes will, when checked, put a hold on issuing the certificate. After the Certificate Holder enters the information the certificate will be emailed to the contacts previous entered, for approval.

☐ Allow Certificate Holders to be added as Additional Insured    226
☐ Approval Required ☐ Allow Lessors to be added as Additional Insured    228
☐ Approval Required ☐ Allow Venders to be added as Additional Insured    230
☐ Approval Required
○ Broad Form    ○ Limited Form    ○ Not Specified    ◉ None

*FIG. 10*

Automobile 234

☐ Any Automobile
☐ All Owned Automobiles
☐ Scheduled Automobiles
☐ Hired Automobiles
☐ Non-owned Automobiles
☐ _____

| Policy number | | Combined Single Limit | 1,000,000 |
| Effective (mm/dd/yyyy) | | Bodily Injury (per person) | |
| Expiration (mm/dd/yyyy) | | Bodily Injury (per accident) | |
| | | Property Damage | |
| Comprehensive | ▼ | | |
| Collision | ▼ | | |

☐ Allow Additional Insureds
☐ Allow Loss Payees      } 237
☐ Approval Required

Worker's Compensation 236

Policy number ____
Effective (mm/dd/yyyy) ____
Expiration (mm/dd/yyyy) ____

WC Statutory Limit ●    Other ○
EL Each Accident             100,000
EL Disease (Each Employee)   100,000
EL Disease (Policy Limit)    100,000

Excess or Umbrella 238

☐ Occurrence
☐ Claims Made

Retention/Deductible ____

Policy number ____
Effective (mm/dd/yyyy) ____
Expiration (mm/dd/yyyy) ____

Each Occurrence ____
Aggregate ____

*FIG. 11*

Other

Unlike other certificate programs, Certificate Exchange allows you to permanently add any line of insurance and it becomes part of the certificate. The type of insurance could be Property, Crime, Professional Liability, D & O, E & O, Motor Truck Cargo, etc. The Description is additional information about the type of insurance, such as "All Risk of physical loss including Boiler and Machinery." The limit descriptions can also be entered such as " Per Occurrence" and "Aggregate."

Type of Insurance: ⌷ —252

Further information about the type of insurance: ⌷
254

Description    Limit

Policy number ⌷
Effective (mm/dd/yyyy) ⌷
Expiration (mm/dd/yyyy) ⌷

☐ Allow Additional Insureds
☐ Allow Loss Payees          253
☐ Allow Mortgagee
☐ Approval Required Remarks Enter text to appear in the Remarks text box on the Certificate. Any text inserted here will appear on every certificate and can only be overridden if a certificate is issued using the Special Certificate functon. 256

[ Cancel (Home Page) ]           [ < Prev ] [ Next > ]

Insured:

Set-up Insured, Insurance Companies

In order to facilitate entry of Insurance Companies, the program builds a database of Insurers for each Producer. Once the database is established, you need only click on the drop down arrow and select an Insurer. This may appear cumbersome in the beginning, but it will greatly speed up data entry once you establish your own Producer's list.

To select an Insurer not on your Producer's list, type in the first few letters of the Insurer's name in the small field and click on "Search". Then click on the Insurer you desire.

To add an Insurer not on the master list (above paragraph), type a "+" sign into the small field and click on "Search". Then place the curser on the larger field and type in the name of the Insurer. To ensure data integrity, this should only be used after performing a careful search of the master list.

272 { First Insurer, Second Insurer, Third Insurer, Fourth Insurer, Fifth Insurer } — Gen. Liab., Auto, WC, Excess, Other — 274

Search

Cancel (Home Page)    < Prev    Next >

*FIG. 13*

—290  [Help]

Insured:

Set-up Insured, Notification Instructions

Cetificate Exchange will automatically e-mail certificates to individuals as listed below. There are 3 notification choices: Instant Notification (sent when they are requested by the Certificate Holders), Monthly Report, and Quarterly Report. If the Insurance Companies you selected require notification, please first enter the name and e-mail address of the underwriter who should receive certificates.

|  | Contact Name | E-mail |
|---|---|---|
| Continental Casualty Company | | |
| | | |
| | | |
| | | |
| | | |

⎬ 292

| | | Individual Notification | Monthly Report | Quarterly Report | None |
|---|---|---|---|---|---|
| Producer | | ○ | ○ | ○ | ⊙ |
| Insured | | ○ | ○ | ○ | ⊙ |
| First Contact | Dave Dagg | ○ | ○ | ○ | ⊙ |
| Second Contact | | ○ | ○ | ○ | ⊙ |
| First Insurer | Continental Casualty Company | ○ | ○ | ○ | ⊙ |
| Second Insurer | | ○ | ○ | ○ | ⊙ |
| Third Insurer | | ○ | ○ | ○ | ⊙ |
| Fourth Insurer | | ○ | ○ | ○ | ⊙ |
| Fifth Insurer | | ○ | ○ | ○ | ⊙ |

⎬ 294

[Cancel (Home Page)]          [< Prev] [Next >]

[ Help ]

Welcome to the Web-based Certificate of Insurance Program

In order to obtain certificate of Insurance, please complete the information below. You only need to enter the first few letters of the Insured's name. The Insured is the entity from whom you desire a certificate.

| Producer |
|---|
| Special Certificate |
| Certificate Reprint |
| FAQ |

Insured: [                                    ] /-302

If you know the password for accessing this Insured, please enter it here. If you do not know the password, leave it blank, press "Start>" and you will be given instructions on the next screen.

Password: [        ] /-304

If you haved used this system to retrieve certificates in the past, please enter your e-mail address here so that we can more easily identify you. (Do not enter your e-mail address if you have not used the system before.)

E-mail: [                    ]

When you have finished, please click on the "Start>" button, below.

[ Start> ]

*FIG. 15*

Insured selected:

Please enter the following information as it is to appear on the Certifcate.

- Company Name:
- Address 1:
- Address 2:
- City:
- State/Province:    Zip/Postal:
- Country:
- Contact (First name):    (Last name):
- Phone:    Fax:

For Identification and delivery purposes, please enter your e-mail address.
E-mail:

Cancel (Home Page)    < Prev    Next >

FIG. 16

Insured: ␣318

You must select at least one type of insurance (from the first set of checkboxes). Please select the types of insurance to be printed on the Certificate.

- ☐ General Liability
- ☐ Automobile
- ☐ Workers' Compensation  ␣320
- ☐ Excess
- ☐ Transit Insurance Cancellation Days (between 10 and 30): [10]
Condition: [Standard Cancellation ▼]

Enter the years and months you estimate you will do business with Insured. ␣322
Years [ ] Months [ ]

General Liability Additional Insured and Vendor's: [Not Needed ▼] ␣324

Automobile Leasing and Financing [Not Needed ▼] ␣326

Other Additional Insured, Loss Payee and Mortgagee [Not Needed ▼] ␣328

In the field below describe the project, or if you are a lessor list the location(s), or if you are an automobile lessor or loss payee list the vehicle(s). If there are many locations or many vehicles, leave the field blank. If the certificate is for vendor's coverage, please also leave blank. Please click on help for further instructions.

␣329

[Cancel (Home Page)]     [< Prev] [Next >]

*FIG. 17*

Insured:

Create and obtain your certificate (you may select more than one option):

☑ Print the certificate or save the certificate to file.
☑ Send the certificate to my e-mail address: _____
☐ Send the certificate to another e-mail address: _____

[ Create ]

You may preview the certificate for accuracy (this does not create the certificate). If it is unacceptable, you may change the information *that you have entered* by clicking on the "<Prev" button at the bottom of the page.

[ Preview ]

If the certificate is still unacceptable, please explain why in the box below and then click "Insufficient". Your message will be sent to the appropriate contact for revision and then e-mailed to you.

[ Insufficient ]

[ Cancel (Home Page) (all data will be lost) ]       [ < Prev ]

*FIG. 18*

| General Liability Additional Insured and Vendors | Blank | Non Blank |
|---|---|---|
| Not Needed | | This certificate only applies to ][D][.] |
| Additional Insured | [CH][ W ][IN][.] | [CH][ W ][IN][ for ][D][.] |
| Lessor's Additional Insured | [CH][ is added as Additional Insured for General Liability but only with respect to premise leased to ][IN][.] | [CH][ is added as Additional Insured for General Liability but only with respect to premise located][D][.] |
| Vendors Endorsement | [CH][ is added as Additional Insured for General Liability subject to the ]{Limited Form} [Blank}[ ][Vendor's Endorsement.] | [CH][ is added as Additional Insured for General Liability subject to the ]{Broad Form} |

FIG. 19

| Automobile Leasing and Financing | Blank | Non Blank |
|---|---|---|
| Not Needed | | This certificate only applies to ][D][.] |
| Lessor's Additional Insured | [CH][ is added as Additional Insured for vehicles leased to ][IN][.] | [CH][ is added as Additional Insured for ][D][.] |
| Loss Payee | [CH][ is added as Loss Payee for vehicles leased to ][IN][.] | [CH][ is added as Loss Payee for ][D][.] |
| Additional Insured and Loss Payee | [CH][ is added as Additional Insured and Loss Payee for vehicles leased to ][IN][.] | [CH][ is added as Additional Insured and Loss Payee for ][D][.] |

FIG. 20

| Other Additional Insured, Loss Payee and Mortgagee | Blank | Non Blank |
|---|---|---|
| None checked | | [This certificate only applies to [D]][.] |
| Additional Insured | [CH][ is added as Additional Insured for ][OT][, but only with respect to operations performed on their behalf by and due to the negligence of ][IN][.] | [CH][ is added as Additional Insured for ][OT][, but only with respect to operations performed on their behalf by and due to the negligence of ][IN][ for ][D][.] |
| Loss Payee | [CH][ is added as Loss Payee.] | [CH][ is added as Loss Payee for ][D][.] |
| Additional Insured and Loss Payee | [CH][ is added as Additional Insured and Loss Payee for ][OT][, but only with respect to operations performed on their behalf by and due to the negligence of ][IN][.] | [CH][ is added as Additional Insured and Loss Payee for ][OT][, but only with respect to operations performed on their behalf by and due to the negligence of ][IN][ for ][D][.] |
| Mortgagee | [CH][ is added as Mortgagee.] | [CH][ is added as Mortgagee for ][D][.] |
| Additional Insured and Mortgagee | [CH][ is added as Additional Insured and Mortgagee for ][OT][, but only with respect to operations performed on their behalf by and due to the negligence of ][IN][.] | [CH][ is added as Additional Insured and Mortgagee for ][OT][, but only with respect to operations performed on their behalf by and due to the negligence of ][IN][ for ][D][.] |

*FIG. 21*

INTERNET INSURANCE CERTIFICATE SYSTEM

CROSS REFERENCE TO RELATED APPLICATIONS

This application claims priority under 35 U.S.C. §119(e) to provisional patent application Ser. No. 60/163,615 filed Nov. 4, 1999.

STATEMENT REGARDING FEDERALLY SPONSORED RESEARCH OR DEVELOPMENT

N/A

This application includes subject matter that is protected by Copyright Law. All rights in such content are reserved.

BACKGROUND OF THE INVENTION

The present invention relates generally to automated systems for establishing proof of insurance, and more specifically to a World Wide Web based system for defining, generating, and managing certificates of insurance.

As it is generally known, certificates of insurance are documents that establish proof of insurance, and are sometimes referred to simply as "certificates" herein. Certificates are required of service suppliers, contractors, manufacturers mortgagees, lessors, users of others' premises and others. A certificate of insurance certifies that an entity or person has purchased insurance coverage, and can frequently also confirm specific details about that insurance that benefit the requestor, who is referred to as the "certificate holder".

In general, the four parties that are involved with a certificate of insurance are as follows:
1. "Certificate Holders": Those who request proof of another's (the "Insured") insurance.
2. "Insured": Those who must provide the Certificate Holder with evidence of their insurance coverage, typically with a certificate.
3. "Producers": Those whose sell insurance policies to the Insured and issue the certificates. Insurance agents and brokers are examples of Producers. In some cases, an insurance company sells insurance directly to an Insured and issues its own certificates directly.
4. The "Insurer(s)": Insurance companies that are shown on the certificate.

In today's practice, the Certificate Holder asks the Insured for a certificate. The Insured then asks the Producer for the certificate. The Producer in turn issues the certificate on behalf of the Insurer. Copies of the certificate are distributed to the Certificate Holder, Insurer, and frequently the Insured. Producers may employ various types of existing certificate management systems. The level of automation in such existing systems varies widely, and may include anything from a nationally deployed computer program and database for a multinational broker, to word processing. A significant drawback of existing Internet based certificate automation systems is that they operate to transfer the workload from the Producer to the Insured, not to the Certificate Holder.

The traditional certificate issuance process requires the Certificate Holder to call, mail or fax a message to the Insured to request a certificate. The Insured then must call, mail or fax a request to the Producer. The Producer then issues the certificate to the Certificate Holder, and also sends copies to the Insurer(s), and frequently also to the Insured. In some cases, the Insured parties may simply tell the Certificate Holders to call the relevant Producer directly to obtain the certificate.

For example, a general contractor may be liable under certain circumstances if a sub-contractor does not have adequate insurance. Since the general contractor would like to avoid such liability, the following sequence of events would be likely to occur:
1. The general contractor asks each sub-contractor for a certificate of insurance with specified limits and a specific "additional insured" wording.
2. The sub-contractors ask their respective Producers to issue the certificates. The sub-contractors each provide the relevant information to their respective Producers, including the name and address of the general contractor, specified limits and the "additional insured" wording.
3. The Producers ask the relevant Insurer(s) to authorize the specific wording.
4. The Insurers authorize the specific wording.
5. The Producers issue the certificates with the specified limits and wording directly to the general contractor with copies sent to the Insurers and sub-contractors.
6. The general contractor checks the certificates for accuracy, and records the information they contain, for example in a database. The general contractor further makes records of the expiration dates of each of the policies referenced on the certificates for renewal certificate purposes.
7. The Insurers file the certificates for later use in processing claims and cancellation.

In another example of the traditional certificate issuing process, a drug store chain may want to make certain that a pharmaceutical manufacturer has product liability insurance. In such a situation, the following events may occur:
1. The drug chain requests a certificate from the pharmaceutical manufacturer and states that it must include a specific type of coverage, such as what is generally referred to as "Broad Form Vendors'" coverage.
2. The pharmaceutical manufacturer asks their Producer to issue the certificate. The pharmaceutical manufacturer provides relevant information to the Producer, including the name and address of the drug chain, and indicates that the certificate must include the required type of coverage.
3. In the case where the insurance policy of the pharmaceutical manufacturer automatically provides the required coverage (some do and some do not), the Producer issues the certificate directly to the drug chain, and provides copes to the Insurer and pharmaceutical manufacturer.
4. The drug chain checks the certificate for accuracy, records the information, for example in a database, and records the expiration dates of the policies in a diary for renewal certificate purposes.
5. The Insurer(s) file the certificate for later use in claims and cancellation.

As described in the examples above, Certificate Holders, Producers and Insurers each generally maintain their own record of issued certificates. In addition, both the Certificate Holder and Producer keep their own renewal records. Since each entity maintains their own independent records, they frequently also maintain their own database.

The existence of multiple, uncoordinated databases results in significant overhead costs. For example, a certificate may contain a clause stating that the Insurer will "endeavor" to notify the Certificate Holder if the policy is cancelled. Occasionally, the Producer eliminates the word "endeavor", making such notification obligatory. No existing system is available which allows an insurer to automatically issue cancellation notifications. Additionally, a certificate can influence the settlement of a claim, and insurance company claim adjusters accordingly may require access to issued certificates. Again, no existing system is available which effectively automates a claim adjuster's work in locating the certificate.

Furthermore, existing systems fail to effectively automate the certificate renewal process. Most insurance policies are annual and many of the relationships between the Insured and Certificate Holders are long term and occasionally, perpetual. The certificate renewal process using existing systems usually requires the Producer to send a list of previously issued certificates to the Insured for review. For those with large volumes, this process is so complex that it is usually easier for the Producer to issue renewal certificates to any entity that previously received a certificate. This process can continue for years and some Insureds issue thousands of unnecessary and potentially inaccurate certificates.

Moreover, some certificates require approval of the Insurer and some require that the insurance policy itself be changed or endorsed to reflect conditions stated on the certificate. In existing systems, the resulting process can be extremely cumbersome. For example, the Certificate Holder might first request a certificate from the Insured. The Insured would then place a request to the Producer who then must ask the underwriter to endorse the policy. The underwriter then notifies the Producer that the endorsement is bound and the Producer issues a certificate and sends or faxes it to the Certificate Holder, Insurer and occasionally, the Insured.

Thus it is seen that existing Certificate of Insurance systems result in a time consuming, unwieldy processes. Accordingly, it would be desirable to have a system which advantageously addresses the above described shortcomings.

BRIEF SUMMARY OF THE INVENTION

In accordance with the present invention, a system and method are disclosed which facilitate the issuance of certificates through use of a Web site, and which employs a single database of relevant information for both issuers and receivers of certificates. The disclosed system includes interfaces and features for multiple parties that are typically involved, including Certificate Holders, Producers, Insurers, and Insured, as well as a registration and certification process for Certificate Holders with large numbers of certificates. The disclosed system includes program logic providing control and security to the parties involved, and allows a Certificate Holder to obtain certificates directly from the disclosed Web site in a manner that is consistent with information regarding an Insured that is entered by a Producer associated with the Insured. The levels of security and control may advantageously be tailored to individual Insured parties, and to specific types of coverage to be listed on the resulting certificates.

The disclosed system further includes a sophisticated interface to Producers which conveniently and efficiently enables a Producer to describe the appropriate approval process to be imposed on certificate requests for individual insured parties, and/or to specific types of coverage to be certified. Moreover, the certificate information database maintained by the disclosed system is advantageously accessible to parties that are involved in either incoming or outgoing certificates.

More specifically, during operation of the disclosed system, a Producer is enabled to set certificate information for an Insured party through the disclosed Web site, and to establishes security and levels of acceptance and tolerance concerning the extent to which certificates may be issued and/or approved. The Insured party may direct requesting parties, such as Certificate Holders, to the disclosed Web site. The Insured may further provide the certificate requester with one of potentially several passwords associated with the Insured.

When the Certificate Holder subsequently initiates a certificate request on the Web site, the Certificate Holder may be required to enter both the name of the Insured party and a password. Depending on the specific password entered, the Web site provides access to different sets of information regarding the Insured, and may further implement different security and/or approval mechanisms with regard to the requested certificate. The specific security features employed by the disclosed Web site may further be determined in response to information obtained from the Certificate Holder during the certificate request process. For example, in response to selection by the Certificate Holder of the Insured by name, together with the password entered by the Certificate Holder, the disclosed Web site provides a series of questions regarding the requested certificate to the Certificate Holder. The answers provided by the Certificate Holder are used to define information to be printed on the certificate, as well as to determine the specific certificate approval process to applied. The disclosed system subsequently obtains approval for the requested certificate, and enables the Certificate Holder to either print the resulting certificate, or have it emailed. Contingent on information provided by the relevant Producer, copies of the certificate may also be immediately emailed to the relevant Producer, Insured and/or Insurance Company(s). Alternatively, reports of issued certificates may be sent periodically to Producers, Insureds and/or Insurance Company(s).

In a preferred embodiment, the disclosed system is configured such that selections made by the Producer in setting up an Insured, control the selections that appear as options to the Certificate Requestor, thus preventing the Requestor from selecting unauthorized options. Moreover, a preferred embodiment of the disclosed system is configured such that the selections made by the Producer in setting up an Insured and the selections made by the Certificate Requester drive computer program logic to determine the wording on the Certificate to prevent issuance of a certificate with unauthorized information and/or unauthorized insurance conditions. Additionally, a preferred embodiment the system is configured to further prevent unauthorized information and/or unauthorized insurance conditions by preventing the Certificate Requestor from entering certain key words or phrases that otherwise could appear on the Certificate.

In a preferred embodiment, the disclosed system may be configured such that explicit approval by the Producer, or the Producer's delegate, of a particular type of certificate for a particular Insured party is required before printing of the certificate by the Certificate Holder. In such an embodiment, after the Certificate Holder enters the relevant information in the form of answers to generated questions, an electronic message may, for example, be sent to the relevant party requesting that the certificate be approved or not approved by return email to the Web site. In one embodiment, the email sent to the relevant party includes a hyperlink to a copy of the proposed certificate for review by the relevant party. The relevant party may then examine the requested certificate, and determine whether the certificate should be approved. If the relevant party approves the certificate, then the certificate is automatically sent to the Certificate Holder, for example through electronic mail. If the certificate is not approved, then the relevant party may contact the Certificate Holder to expressly indicate that the requested certificate was not approved.

In a further aspect of the disclosed system, an Incoming Certificates Process may be employed by a Certificate Holder that is requesting and processing large numbers of certificates. The disclosed Incoming Certificates Process enables Producers to verify insurance requirements that were previously established by a Certificate Holder, and for a certificate to be immediately issued to the Certificate Holder. If the relevant coverage is subsequently determined to not meet the requirements entered by the Certificate Holder, then such deficiency is noted and reported as necessary.

The certificate information database of the disclosed system may further serve as a convenient storage mechanism for certificate information for both Certificate Holders and Producers.

BRIEF DESCRIPTION OF THE SEVERAL VIEWS OF THE DRAWING

The invention will be more fully understood by reference to the following detailed description of the invention in conjunction with the drawings, of which:

FIG. 2 is a flow chart illustrating steps performed by a producer to set up information regarding an insured party in an illustrative embodiment;

FIG. 3 is a flow chart illustrating steps performed by a certificate requester to request a certificate in an illustrative embodiment;

FIG. 5 is a representative user screen for signing in a Producer;

FIG. 6 is a representative user screen for determining a Producer option;

FIG. 7 is a representative user screen for obtaining the identification information for an Insured party;

FIG. 8 is a representative user screen for obtaining the level of security to be associated with an Insured party;

FIG. 9 is a representative user screen for obtaining contact and approver information to be associated with an Insured party;

FIG. 10 is a representative user screen for obtaining general liability policy information and selecting options to be provided to the certificate Requestor to be associated with an Insured party;

FIG. 11 is a representative user screen for obtaining automobile, workers' compensation and excess or umbrella policy information and selecting options to be provided to the certificate Requestor to be associated with an Insured party;

FIG. 12 is a representative user screen for adding a permanent record for any other type of insurance, obtaining policy information about that type of insurance and selecting options to be provided to the certificate Requestor to be associated with an Insured party;

FIG. 13 is a representative user screen for obtaining the identities of insurance companies to be associated with the aforementioned insurance types and an Insured party;

FIG. 14 is a representative user screen for obtaining contact information and providing delivery instructions for all of the four Parties associated with the certificate to be associated with an Insured party;

FIG. 15 is a representative user screen for obtaining the identity of an Insured party from whom a certificate is being requested;

FIG. 16 is a representative user screen for obtaining information regarding the party requesting a certificate;

FIG. 17 is a representative screen for the Requestor to provide instructions on the type of insurance, conditions to the types of insurance selected, the term of the relationship, the cancellation condition and a description of the activity;

FIG. 18 is a representative user screen for obtaining delivery instructions and further informational needs of the certificate; and FIGS. 19-21 are tables illustrating the logic used to process the contents of a remarks field.

DETAILED DESCRIPTION OF THE INVENTION

All disclosures of provisional patent application Ser. No. 60/163,615, filed Nov. 4, 1999, and entitled "Internet Insurance Certificate System," are hereby incorporated by reference herein.

Figure 1:
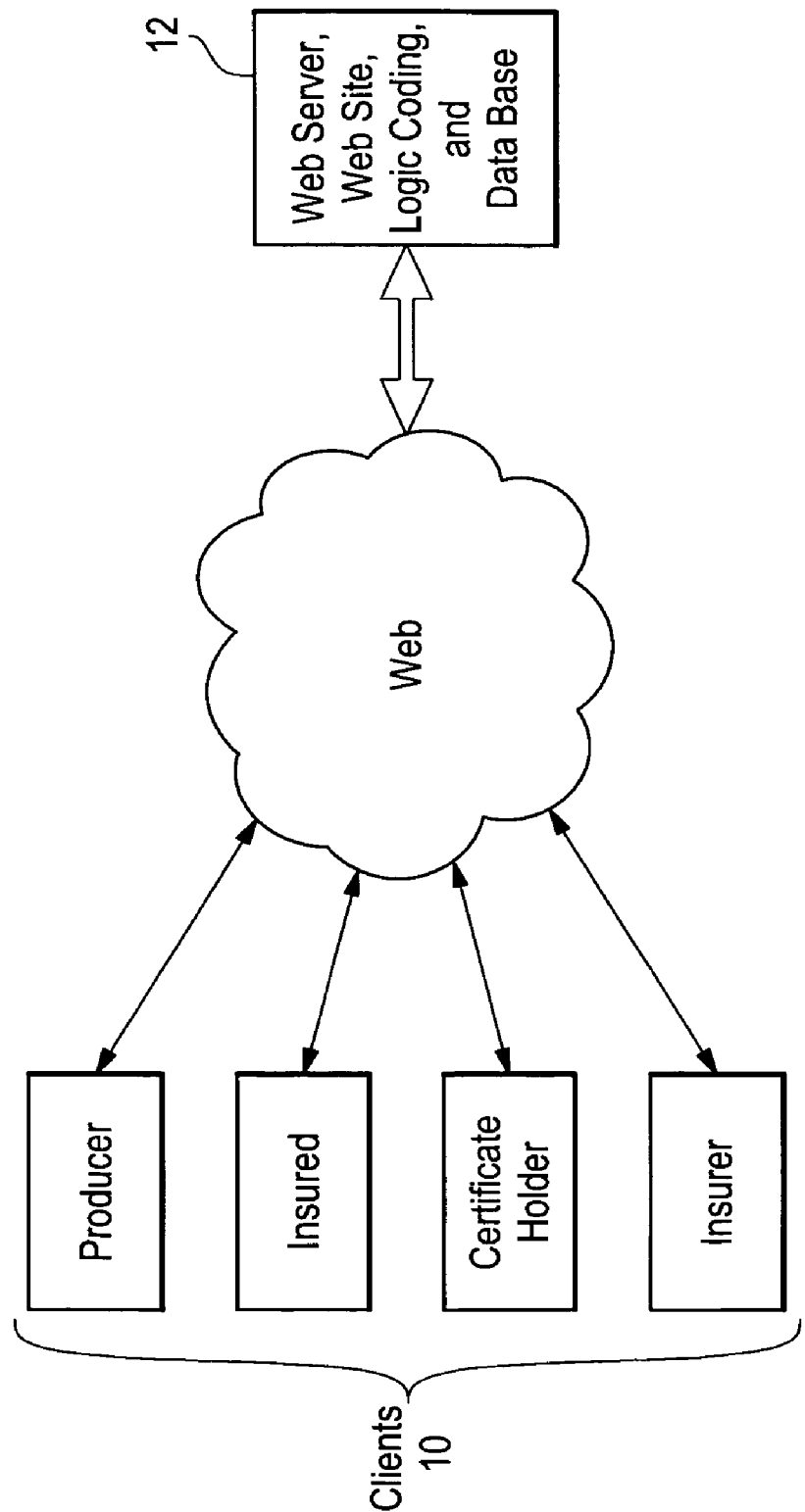
FIG. 1 shows an embodiment of the disclosed system in which a Web site is used in connection with a certificate information database to provide services to a number of client systems.

The disclosed system for issuing certificates of insurance, and managing certificate of insurance related information, may be implemented through a Web site on the World Wide Web. For example, as shown in FIG. 1, client machines 10 effect transactions to a Web server system 12 using the Hypertext Transfer Protocol (HTTP), which is a known application protocol providing users access to various types of files (e.g. text, graphics, images, sound, video, etc.) using a standard page description language known as the Hypertext Markup Language (HTML). A Web page is a document that is accessible over the Web, and that is typically identified using a Uniform Resource Locator (URL). Accordingly, requests for Web pages through an HTML-compatible browser (e.g. Netscape Navigator or Microsoft Internet Explorer) executing on one of the client machines 10 generally involve specification of a requested Web page by that Web page's URL. The requesting one of the client machines 10 receives, in return, a document or other object formatted according to HTML. A collection of Web pages and/or other documents or programs supported on a Web server or servers, such as the server cluster 12, is sometimes referred to as a Web site.

In a preferred embodiment, and as shown in FIG. 1, the Web server system 12 includes a Web site, Web-accessible computer program logic coding and a certificate information database. Thus the Web server system 12 provides a Web-based application program accessible by the client systems 10 over the World Wide Web 11. As it is generally known, the client systems 10 typically include a suite of conventional Internet tools, including a Web browser, operable to access and obtain services from servers connected to the Web 11. Various known Internet protocols are used in connection with the services provided by servers within the Web server system 12. Thus, for example, browsing may be provided using the Hypertext Transfer Protocol (HTTP), which provides users of the client systems 10 access to multimedia files, including files written in the Hypertext Markup Language (HTML).

For purposes of illustration, a representative one of the client systems 10 may be a personal computer, notebook computer, Internet appliance or personal computing device (e.g. a PDA), that may, for example, be based on one or more x86-, PowerPC®, or RISC type processors. An illustrative client system may include an operating system such as Microsoft Windows or Microsoft Windows CE. As noted above, each client system may include a suite of Internet tools including a Web browser, such as Netscape Navigator or Microsoft Internet Explorer, that may have a Java Virtual Machine (JVM) and/or support for application plug-ins or helper applications.

Further for purposes of illustration, a representative Web server system 12 is based on an Intel i686 central processing unit (CPU), and includes an associated memory for storing programs executable on the CPU. The Web server system 12 further runs the Linux operating system and the Apache Web server program. Various communication links may be used to connect to the Web server system 12, such as a Digital Subscriber line or T1 connection. The illustrative Web server system 12 of FIG. 1 is further configured to allow some restricted access to the data for the convenience of administrators and preferred users, but can be completely isolated to a Common Gateway Interface (CGI) of the computer program logic coding within the server system 12. In the illustrative embodiment of FIG. 1, the CGI is used by the Web server program within the Web server system 12 to pass requests received from the client systems 10 to the computer program logic within the Web server system 12, and to receive data back to forward to the client systems 10. Accordingly, when a user of one of the client systems 10 fills out a form on a Web page provided by the Web server system 12, and sends it in, the Web server program within the Web server system 12 passes the form information to associated computer program logic code executing on the Web server system 12 that processes the data, and that may send back a confirmation, rejection or error message.

Further during operation of the illustrative embodiment shown in FIG. 1, permission to access the data within the certificate information database is generally denied to other machines. Users of the client systems 10 define IDs and passwords that are used to enforce limited access to data and functionality within the Web server system 12. In one embodiment, the certificate information database within the Web server system 12 is based on the Kdb database provided by Kx Systems, Inc. K is the language inherent to Kdb. Accordingly, in such an embodiment, the programming language K is used to implement the computer program logic associated with the disclosed system executing on the Web server system 12. Other database technologies, such as Sybase, Sequel Server and Oracle, as well as other programming languages may be used alternatively. In the illustrative embodiment of FIG. 1, the computer program logic code communicates with the CGI and the Web server program within the Web server system 12, and the computer program logic code further communicates via inter-process communication to the Kdb data. The Kdb RDBMS software provides the standard security mechanisms of SQL/92, and more. The input from HTML forms uses encoded values to reassure the CGI code that the user has logged on properly.

As illustrated in FIG. 1, the parties typically involved with insurance certificates access the components of the Web server system 12 through the client systems 10. In particular, Producers, Insureds, Certificate Holders and Insurers use the client systems 10 to access the Web server system 12 over the World Wide Web 11.

The disclosed system allows three types of parties to issue what are referred to as "Outgoing" certificates with various levels of security. In addition, the present system includes a separate respective process, implemented within the computer program logic executing on the Web server system 12, for each of the parties permitted to issue an Outgoing certificate. A fourth process is provided by the disclosed system for "Incoming" Certificates. These four processes operate as follows:

1. Producer Process (Outgoing Certificates): The disclosed system enables Producers to add or change information on-line related to a certificate in the certificate information database through a Producer process. The Producer Process also allows the Producer to issue certificates on-line.
2. Insured Process (Outgoing Certificates): The disclosed system includes an Insured Process through which an Insured can issue his or her own certificates on-line. The disclosed system includes security features which prevent the Insured from issuing a certificate outside the scope of the applicable security policy.
3. Certificate Holder Process (Outgoing Certificates): The Certificate Holder Process of the disclosed system enables a Certificate Holder to issue their own certificates on-line and immediately. The disclosed system provides a higher level of security in connection with the Certificate Holder Process, preventing the Certificate Holder from accessing unauthorized information and from adding unauthorized conditions to the certificate.
4. Incoming Certificates Process: The Incoming Certificates Process of the disclosed system enables Producers to verify previously established insurance requirements and for a certificate to be immediately issued. If the relevant coverage does not meet the requirements the deficiency is noted and reported.
5. Reports can be generated and downloaded for the Certificate Holder, Insured, Producer and Insurer(s). Each of the respective parties are only allowed information associated with the party. These reports can be used for many purposes including generation of the obligatory cancellation notifications and for claim adjustment.

Each one of the above described processes is accessible to the appropriate party through the Web site as accessed using one of the client systems 10. FIG. 2 illustrates steps performed with regard to the Producer Process. At step 30, a Producer registers or signs in to the disclosed system through the Web site provided by the Web server system 12 shown in FIG. 1. Signing in by a Producer at step 30 may include entering a Producer ID and associated password for security and verification purposes.

At step 32, the Producer selects from a number of option which are presented in a display screen. The Producer may, at step 32, select an option from a display screen which enables the Producer to set-up information related to an Insured party. Other options that may be presented to a Producer include revising an Insured Party, revising the registration information of the Producer, reprinting a certificate, and/or creating an attachment.

As a result of selecting the option for setting-up an Insured party at step 32, at step 34 the Producer enters identification information related to the Insured party being set up. Other information which may be entered at step 34 includes information relating to removal of the words "endeavor to" from the cancellation clause of certificates associated with the Insured party, and/or inclusion of attachments with the Insured's certificates.

At step 36, the Producer selects the level of security to be associated with the Insured party's certificates in general. The levels of security that may be selected at step 36 include:

Unsecured and open to the general public: This security level is appropriate for an Insured party with a large volume of certificates and certificates which are routine and do not convey any or only limited rights to the Certificate Holder.

Password required to enter the system: This security level requires either the Producer or the Insured to provide the appropriate password to the Certificate Holder. A field is presented to the Producer at step 36 for entry of the password into the system.

Approval required: This security level does not require a password, but the Certificate Holder will not receive the certificate until it is approved by either a first or second contact, as established by the Producer. After a Certificate Holder enters the certificate information, the system sends electronic mail to the contacts for approval of the certificate.

Password and approval required: This security level requires both a password to access the system, and approval of any requested certificates.

Further at step 36, the Producer may enter a password for accessing the system that the Insured and the Producer or Broker are to provide to anyone who wishes to use the system to request a certificate associated with the Insured. The producer may further enter a password at step 36 that is to be used only by the Producer to produce unique certificates, as well as a password to be used by the Insured to obtain reports regarding certificate activity relating to the Insured.

At step 38, the Producer enters contact and approver information associated with the Insured. The information entered by the Producer at step 38 may include electronic mail addresses of any approvers, so that the disclosed system may seek approval for any requested certificates through electronic mail. Contacts provided at step 38 will also be displayed on the screen while a Certificate Holder uses the disclosed system, so that the Certificate Holder can contact them if they have any questions. Contacts entered at step 38 may also be designated for inclusion in any printed certificate regarding the Insured.

The Producer enters insurance policy information regarding the Insured at step 40. Further at step 40, the Producer is presented with a preferred wording for General Liability Additional Insureds, which may be overridden by the Producer. For example, the default preferred wording provided by the system may be as follows:

"ABC Corporation (the Certificate Holder) is added as an Additional Insured for General Liability, but only with respect to operations performed on their behalf and due to the negligence of XYZ Corporation (the Insured)."

If the Producer desires a different default wording, such wording may be entered at step 40. Further at step 40, the Producer may make selections which allow the Certificate Holder to perform certain additions to certificates, and to indicate whether approval should be sought when such are additions are present in a given certificate. For example, at step 40 the Producer may indicate whether Certificate Holders may be added as additional insured, and whether approval must be obtained before issuing a certificate in which a Certificate Holder has been added as an Additional Insured. Similarly, at step 40, the Producer may indicate that lessors may be added as Additional Insured, and whether approval must be sought for certificates in which a lessor has been added as an Additional Insured. In addition, the Producer may indicate that vendors may be added as Additional Insured, and whether approval must be sought for certificates in which a vendor has been added as an Additional Insured.

At step 42, the Producer selects any attachments which are to be associated with the Insured, and at step 44 the Producer enters insurance company information relating to the Insured. The Producer is further enabled to enter remarks at step 42 which are to be included in each certificate issued for the Insured, unless they are overridden by the Certificate Requester who has special privileges to issue certificates entitled "special certificate". At step 44, the Producer selects the Insurance companies associated with the Insured, and at step 46, the Producer enters in contact information describing parties that are to be provided with information regarding certificates issued to the Insured. Such certificate information may be provided in response to individual certificates being issued, or periodically, as selected by the Producer at step 46.

FIG. 3 is a flow chart illustrating steps performed in connected with requesting a Certificate of Insurance using the disclosed system. At step 60, a certificate requester, such as a Certificate Holder, indicates the Insured party for whom a certificate is to be requested. In addition, the requester further enters any password associated with the indicated Insured at step 60. The disclosed system verifies that any password entered at step 60 is correct, and only allows access to information regarding the indicated Insured in the event that the requester has provided any necessary password.

At step 62, the requester enters their name and address information as it is to appear on the requested certificate. The requester then selects the type of insurance to be certified by the certificate at step 64, as well as the relevant policy conditions at step 66. A project description is then provided by the requester at step 68. The requester enters delivery instructions at step 70, which may indicate that the requested certificate is to be printed by the requester, or that the certificate is to be saved to a file, or that the certificate is to be send electronically either to the email address of the requester, or another email address. The requester indicates that the information for the certificate is complete and that the certificate should be created at step 72. If there is no approval associated with the requested certificate, then the disclosed system immediately creates the certificate. Otherwise, at step 74, the appropriate approval is sought. For example, the disclosed system may send an electronic copy, or a link to an electronic copy, of the requested certificate to one or more approvers that were provided by the Producer that entered information regarding the Insured. The approvers may then inspect information on the certificate, and follow a predetermined approval procedure. Such an approval procedure may consist of simply sending an electronic reply to the approval request message. In a further illustrative embodiment, the approval request message includes either a copy of or link to a modifiable or editable version of the requested certificate. In such an embodiment, the approver may make any predetermined and necessary changes to the certificate prior to approving it. At step 74, the disclosed system receives the requested approval, and issues the requested certificate at step 76.

Many firms must keep track of the certificates that they ask for and receive. The disclosed system enables an Insured party to allow a party that needs proof of insurance, such as a Certificate Holder, to obtain a certificate directly from the Web site on the Web server system 12 of FIG. 1. This feature enables the Certificate Holder to register their needs and then have the Insured's Producer verify the registration. Once verified, the certificate is issued. This process adds the Incoming certificate to the same database as Outgoing certificates which eliminates the need for the Insured and Producer to issue the typical Outgoing certificate and yet reports can be generated by all four parties combining Incoming and Outgoing issued certificates. The process through which this verification occurs is referred to as the Incoming Certificate process, the steps of which are illustrated in FIG. 4.

Figure 4:
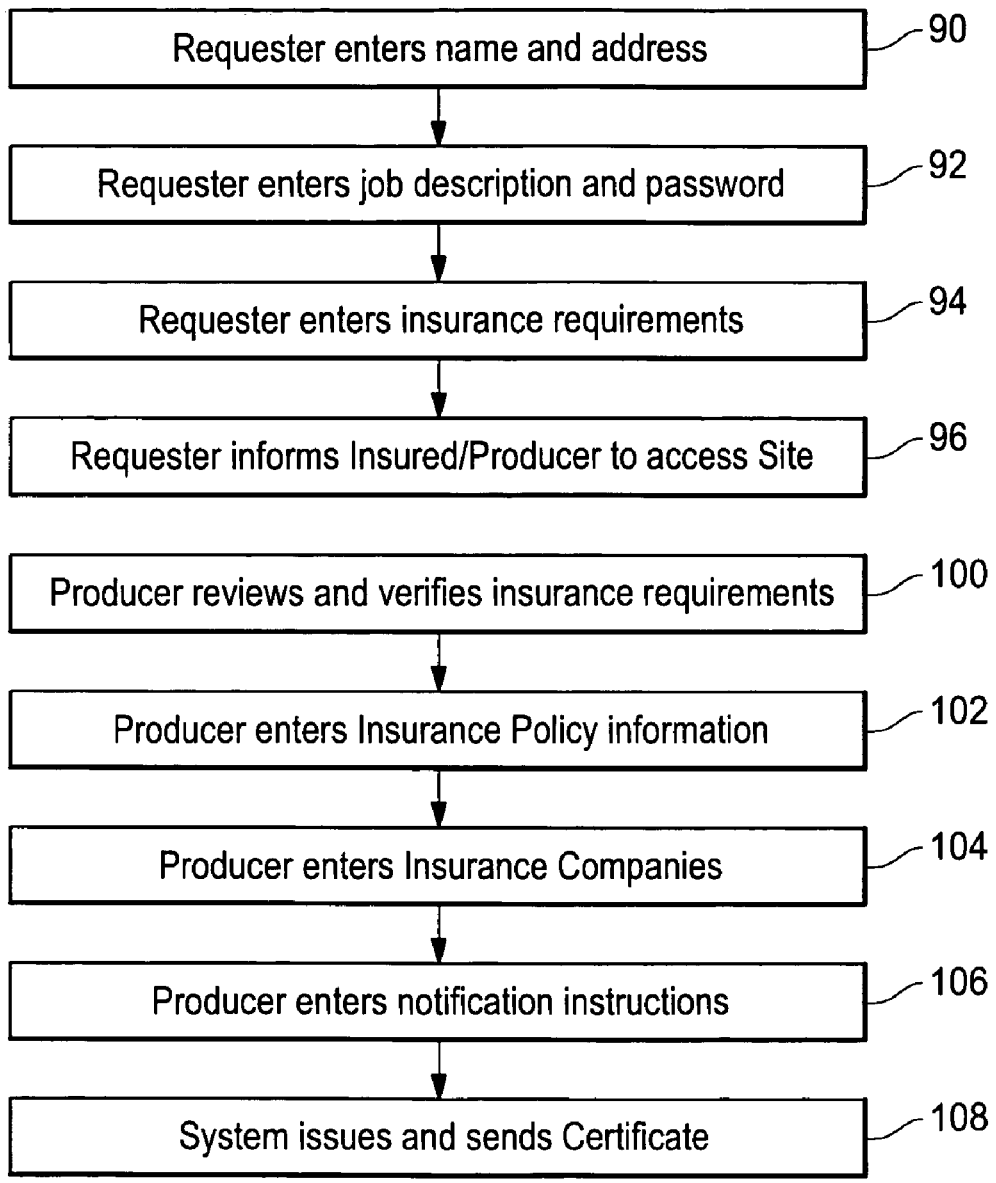
FIG. 4 is a flow chart illustrating steps performed by a certificate holder requester to register a certificate request and for a Producer to verify the registration for the incoming certificate process.

As seen in FIG. 4, the first step 90 of the Incoming Certificate process is for a Certificate Holder to register their insurance needs. The Certificate Holder enters its Name, Address, email, etc., as well as a Job Description User ID and password. The Job Description User ID is then employed to distinguish one project from another. Next, at step 94, the Certificate Holder registers their insurance requirements, for example by filling out an electronic form. For example, the Incoming Certificate Holder fills in fields at step 94 which indicate whether General Liability and/or Auto insurance are required, what liability limits are required, whether other types of insurance are required, any additional text that must be included on the certificate, and whether or not "endeavor to" language is to be included on the certificate.

The information provided in steps 90-94 are then used by the disclosed system to generate a template for the Insured's Producer to verify. The Certificate Holder instructs the Insured to advise their Producer to access the site, and to provide the identify of the Certificate Holder and associated password to the Producer as well. This step is illustrated by step 96 in FIG. 4.

When the Producer subsequently accesses the disclosed system at step 100, the disclosed system asks the Producer to verify that the Producer has previously registered by entering the Producer's User ID and password. If not registered, the Producer is required to do so. Once Producer registration is verified or a new Producer registration is made, the Producer enters the identity of the previously registered Certificate Holder together with the associated password. The Producer is then asked if they have previously set-up the Insured by selecting the Insured from an Insured look-up of previously set-up Insureds associated to that Producer. If an existing Insured is selected by the Producer, the computer program logic code of the disclosed system will produce a display with the following:

Producer name and address.
Insured name and address.
Coverage details entered by the Certificate Holder in red.
Companies, Company Letters, Policy Number, Effective Date and Expiration Date but only for GL, AL, WC and EX if there is match between the Certificate Holder's template and the Insured information already entered in the system.
Certificate Holder name and address.

If there is no match of an Insured, the Producer enters insurance policy information at step 102 and insurance companies at step 104. A distribution screen is presented at step 106, into which the Producer may select and/or enter indications of who will receive a certificate.

At step 108, the Certificate Holder is automatically issued the certificate. It is sent as an email attachment. The email indicates whether the Producer has revised the coverage details. If the Producer has revised the coverage details, the email lists the details that have been revised. The Insured's and Producer's name, address, contact, telephone and email information are included in the email.

FIGS. 5 through 14 are user screens provided by the Producer Process to enable a Producer to enter or change information regarding an Insured. FIG. 5 shows an illustrative user screen 148 through which a Producer may sign in by providing a user ID associated with the Producer in a field 150 and a password associated with the Producer in a field 152. The user screen 148 further is shown including a button 154 through which a Producer may create a new account. FIG. 6 shows an illustrative user screen 160 including a number of selectable options for a Producer that has previously signed onto the system. In particular, a set-up insured button 162 is shown.

The set-up process for an insured is further illustrated by the user screen 170 of FIG. 7, which enables a Producer to enter information regarding an Insured into the disclosed system. The user screen 170 further provides a check box 174 which enables the Producer to indicate that the words "Endeavor To" may be removed from the cancellation clause of certificates issued for the Insured, and a check box 176 which enables the Producer to indicate that attachments may be included with such certificates.

FIG. 8 illustrates a user screen 180 in which a Producer may indicate the level of security to be associated with an Insured. As shown in FIG. 8, the Producer may select a first check box 182 indicating that certificates for the Insured are to be unsecured and open to the general public, a second check box 184 indicating that a password is required to access certificates for the Insured, a third check box 186 indicating that approval is required for certificates for the Insured, or a fourth check box 188 indicating that both password protection and approval are to be required. A field 190 is provided for entry of a password to be used by someone that is requesting a certificate for the Insured. A field 192 is provided to receive a password to be used by the Producer to produce unique certificates, and a field 194 is provided to receive a password that is to be used by the Insured to obtain reports regarding certificate activity related to the insured.

FIG. 9 shows an illustrative user screen 210 for receiving contact information from a Producer regarding an Insured party. The user screen 210 enables a Producer to enter information regarding a first contact 212 and a second contact 214. Such contact information may be displayed on the screen when a Certificate Holder is using the disclosed system with regard to certificates of the Insured. Such contacts may further be used during any necessary approval process for certificates associated with the Insured. A number of check boxes 216 are further provided which enable the Producer to indicate whether or not the contact information should be printed on certificates of the Insured, and if so, where.

FIG. 10 is an illustrative user screen 220 which enables a Producer to set-up insurance policy information for an Insured. A general liability information section 222 includes check boxes and text entry fields related to the type of insurance and limitations of coverage to be associated with the Insured. A text entry box 224 is further provided to enable the Producer to enter override language to be used as a substitute for the general liability additional insured default language used on the certificates. A pair of check boxes 226 enables the Producer to indicate whether Certificate Holders may be added as Additional Insured on the certificates, and whether approval is required for such certificates. A pair of check boxes 228 is provided to enable the Producer to indicate whether Lessors may be added as Additional Insured, and whether approval is required for such certificates. Finally, a pair of check boxes is provided to enable the Producer to indicate whether Vendors may be added as Additional Insured, and whether approval is required for such certificates.

In FIG. 11, an illustrative user screen 232 for obtaining insurance policy information from a Producer regarding an Insured when the Producer is setting up information regarding the Insured. The user screen 232 is shown including an automobile coverage section 234, a worker's compensation section 236, and an excess or umbrella section 238. Three check boxes 237 enable the Producer to indicate whether Certificate Holders may be added as Additional Insured and Loss Payee on the certificates, and whether approval is required for such certificates.

FIG. 12 shows an illustrative user screen 250 which includes a text field 252 for entry by the Producer of a line of insurance to be associated with an Insured when the Producer sets up information regarding the Insured. Another text box 254 enables the Producer to enter further information regarding the line of insurance listed in the text field 252. Four check boxes 253 enable the Producer to indicate whether Certificate Holders may be added as Additional Insured, Loss Payee and Mortgagee on the certificates, and whether approval is required for such certificates. The information provided regarding such an additional line of insurance through the user screen 250 may then be automatically included within certificates issued for the Insured.

A remarks box 256 is further shown in FIG. 12. Text inserted by the Producer within remarks box 256 will appear on every certificate issued for the Insured, except in the case where the Certificate Holder requests a Special Certificate.

The illustrative user screen 270 shown in FIG. 13 is used to receive insurance company information regarding an Insured from a Producer, for example, when the Producer is setting up information regarding the Insured. A list of insurers may be entered by the Producer into the text fields 272 for this purpose, together with indication of the type of insurance that they provide in one or more of the check boxes 274.

FIG. 14 includes an illustrative user screen 290 used to obtain notification information from a Producer, regarding an Insured. A number of text boxes 292 are used to enter contact name and email addresses for a number of insurance companies associated with the Insured. The check boxes 294 further enable the Producer to indicate a specific type of notification for each party, such as individual or immediate notification, monthly reports, quarterly reports, or none.

FIGS. 15-18 are user screens provided by the Certificate Holder Process in order to obtain information from a Certificate Holder that is requesting a certificate. FIG. 15 shows an illustrative user screen 300 for obtaining the identity of the Insured in a text box 302, as well as any necessary password in the text box 304. FIG. 16 is a user screen 310 for obtaining information regarding the Certificate Holder during the process of requesting a certificate. The user screen 310 is shown including text boxes 312 for receiving company information regarding the Certificate Holder, and a text box 314 for obtaining the email address of the Certificate holder.

FIG. 17 is a representative screen 318 for the Certificate Holder to provide instructions on the type of insurance, conditions to the types of insurance selected, the term of the relationship, the cancellation condition and a description of the activity. In particular, screen 318 includes a number of check boxes 320 through which the Certificate Holder may select the types of insurance to be printed on the certificate. The only check boxes that appear are selected by the Producer in the Insured Set-up to prevent issuance of a certificate with an erroneous type of insurance. A term of relationship section 322 enables the Certificate Holder to specify the duration of the relationship with the Insured. A pull down menu 324, containing information established by the Producer in the Insured Set-up process, provides a list of insurance options relating to General Liability Additional Insured and Vendors. For example, the pull down menu 324 may allow the Certificate Holder to select one of the following options to be associated with the requested certificate:
Not Needed
Additional Insured
Lessor's Additional Insured
Vendor's Endorsement The pull down menu 326, containing information established by the Producer in the Insured Set-up process, provides a list of insurance options relating to Automobile Leasing and Financing. For example, the pull down menu 326 may allow the Certificate Holder to select one of the following options to be associated with the requested certificate:
Not Needed
Lessor's Additional Insured
Loss Payee
Additional Insured and Loss Payee The pull down menu 328, containing information established by the Producer in the Insured Set-up process, provides a list of insurance options relating to Other Additional Insured, Loss Payee and Mortgagee. For example, the pull down menu 328 may allow the Certificate Holder to select one of the following options to be associated with the requested certificate:
Additional Insured
Loss Payee
Additional Insured and Loss Payee
Mortgagee
Additional Insured and Mortgagee A text entry box 329 is provided for entry of text to be included within the Remarks section of the requested certificate. The disclosed system allows the requesting Certificate Holder to enter text free form into this box, and then checks the text that was entered based on the selections made from pull down menus 324, 326 and 328, as well as the contents of the certificate information database. Certain key words are not permitted to be entered by the Certificate Holder to prevent issuance of an unauthorized or erroneous certificate. The computer program logic of the disclosed system further ensures that a nearly perfect sentence results from any modifications made to the free form text entered into the text entry box 329. In this way the disclosed system ensures that the sentence entered into the Remarks box on the actual certificate reflects the selections from the pull down menus 324, 326 and 328, as well as the data associations within the certificate information database to prevent the issuance of an unauthorized or erroneous certificate.

A user screen 330 shown in FIG. 18 includes a section 332 which enables the Certificate Holder to indicate how the created certificate should be issued or delivered, a preview button 334 which enables the Certificate Holder to preview the requested certificate without creating it, and an explanation text box for the Producer to enter in reasons why the previewed certificate is not acceptable to the Certificate Holder.

FIGS. 19-21 illustrate the logic in the computer program of the disclosed system for processing the text entered into the remarks text entry box 329 shown in shown in FIG. 17. This logic prevents issuance of an unauthorized or erroneous certificate. In the tables shown in FIGS. 19-21, the following rules apply:
CH=Certificate Holder
IN=Insured
W=Wording
D=Description from the text entry box 329
OT=Other Name
W=either the standard wording or override wording on the General Liability Insured Form
OT=the name of the Other type of insurance Other text strings contained within [ ] are literal text strings that are to be inserted in the resulting sentence. In the case where the Certificate Holder enters a period at the end of the text in text entry box 329, it is ignored to prevent two periods being generated at the end of the sentence in the remarks box of the certificate.

The table 350 in FIG. 19 describes actions taken in response to the selection by the Certificate Holder of one of the items listed in pull down menu 324 of FIG. 17. The rows 356 of the table 350 correspond to the items within the pull down menu 324. The columns 352 and 354 indicate whether the text entry box 329 was left blank (column 352), or became non-blank (column 354) as a result of the Certificate Holder entering text. Accordingly, the appropriate action defined by the table 350 is described by the table entry found at the intersection of the applicable row with the applicable column. For example, in the case where the Certificate Holder has selected Lessor's Additional Insured from the pull down menu 324, and has left the text entry box 329 blank, the appropriate entry in the table 350 is the entry 357, which indicates that the program code of the disclosed system will construct a complete sentence based on the following logic:

[CH] [is added as Additional Insured for General Liability but only with respect to premise leased to] [IN] [.]

The table 370 in FIG. 20 describes actions taken in response to the selection by the Certificate Holder of one of the items listed in pull down menu 326 of FIG. 17. The rows 376 of the table 370 correspond to the items within the pull down menu 326. The columns 372 and 374 indicate whether the text entry box 329 was left blank (column 372), or became non-blank (column 374) as a result of the Certificate Holder entering text. Accordingly, the appropriate action defined by the table 370 is described by the table entry found at the intersection of the applicable row with the applicable column. For example, in the case where the Certificate Holder has selected Loss Payee from the pull down menu 326, and has left the text entry box 329 blank, the appropriate entry in the table 350 is the entry 377, which indicates that the program code of the disclosed system will construct a complete sentence based on the following logic:

[CH] [is added as Loss Payee for vehicles leased to] [IN] [.]

The table 390 in FIG. 21 describes actions taken in response to the selection by the Certificate Holder of one of the items listed in pull down menu 328 of FIG. 17. The rows 396 of the table 390 correspond to the items within the pull down menu 328. The columns 392 and 394 indicate whether the text entry box 329 was left blank (column 392), or became non-blank (column 394) as a result of the Certificate Holder entering text. Accordingly, the appropriate action defined by the table 390 is described by the table entry found at the intersection of the applicable row with the applicable column. For example, in the case where the Certificate Holder has selected Mortgagee from the pull down menu 328, and has left the text entry box 329 blank, the appropriate entry in the table 390 is the entry 397, which indicates that the program code of the disclosed system will construct a complete sentence based on the following logic:

[CH] [is added as Mortgagee.]

Those skilled in the art should readily appreciate that the programs defining the functions of the computer program logic code of the disclosed Web server system can be implemented in and delivered to a specific embodiment of the disclosed system in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the functionality of the bridge input/out modules and/or switching fabric may be embodied in computer software, these functions may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What is claimed is:

1. A system for creation of a certificate of insurance that prevents creation of an unauthorized certificate of insurance, on behalf of an insured, by a third-party, which is one or more of the insured, a certificate holder or others acting on behalf of an insured or certificate holder, comprising:

a database storing insurance coverage information about each of a plurality of insureds; and a computer system communicably coupled to the database, the computer system comprising computer program instructions to:

(a) provide a first user interface under control of a first user, which is one or more of an insurer, an insurance agent or broker acting on behalf of the insurer, or an insured authorized by the insurer or by the insurance agent or broker acting on behalf of the insurer, to accept, from the first user, an insured name and address, insurance policy details, and certificate wording allowed or disallowed to prevent unauthorized insurance coverage information from being included in the certificate of insurance;

(b) provide a second user interface for the third-party to select a specific insured and provide a certificate holder name, address and certificate purpose;

(c) restrict the certificate holder name, address and certificate purpose provided by the third party in accordance with the certificate wording allowed or disallowed accepted from the first user;

(d) create the certificate of insurance with the insured name, address and insurance policy details accepted from the first user, and the certificate holder name, address and certificate purpose provided by the third party, as restricted in accordance with the certificate wording allowed or disallowed; and (e) provide the certificate of insurance to the certificate holder.

2. The system of claim 1, wherein the computer system further comprises:

computer program instructions operable to:

accept from the first user information about an approver to be notified and an approval process to provide notification to the approver when the third-party provides certain input data comprising certain selections through the second user interface; and the computer system further comprising computer program instructions operable to:

send an electronic message to the approver prior to creating the certificate of insurance when the third-party provides the certain input data;

permit the approver to edit the certificate of insurance; and indicate approval of the certificate of insurance whereby creation of an approved certificate of insurance is permitted.

3. The system of claim 1, wherein the computer system further comprises:

computer program instructions operable to:

accept from the first user sentence portions or sentences for selection by the third party to provide additional insurance policy details; and permit the third party to select the sentence portions or sentences while preventing the third party from editing the sentence portions or sentences.

4. A method for creation of a certificate of insurance that prevents creation of an unauthorized certificate of insurance, on behalf of an insured, by a third-party which is one or more of the insured, a certificate holder or others acting on behalf of an insured or certificate holder, comprising:

storing insurance coverage information about each of a plurality of insureds;

providing a first user interface under control of a first user, which is one or more of an insurer, an insurance agent or broker acting on behalf of the insurer, or an insured authorized by the insurer or by the insurance agent or broker acting on behalf of the insurer, to accept, from the first user, an insured name and address, insurance policy details, and certificate wording allowed and disallowed to prevent unauthorized insurance coverage information from being included in the certificate of insurance;

providing a second user interface for the third-party to select a specific insured and provide a certificate holder name, address and certificate purpose;

restricting the certificate holder name, address and certificate purpose provided by the third party in accordance with the certificate wording allowed or disallowed accepted from the first user;

creating the certificate of insurance with the insured name, address and insurance policy details accepted from the first user, and the certificate holder name, address and certificate purpose provided by the third party, as restricted in accordance with the certificate wording allowed or disallowed; and providing the certificate of insurance to the certificate holder.

5. The method of claim 4, further comprising:

accepting from the first user information about an approver to be notified and an approval process to provide notification to the approver when the third-party provides certain input comprising certain selections through the second user interface;

sending an electronic message to the approver prior to creating the certificate of insurance when the third-party provides the certain input;

permitting the approver to edit the certificate of insurance; and indicating approval of the certificate of insurance whereby creation of an approved certificate is permitted.

6. The method of claim 4, further comprising:

accepting from the first user sentence portions or sentences for selection by the third-party to provide additional insurance policy details; and permitting the third-party to select the sentence portions or sentences to be provided while preventing the third-party from editing the sentence portions or sentences.

* * * * *

UNITED STATES PATENT AND TRADEMARK OFFICE
CERTIFICATE OF CORRECTION

| | | |
|---|---|---|
| PATENT NO. | : 7,398,220 B1 | Page 1 of 1 |
| APPLICATION NO. | : 09/706101 | |
| DATED | : July 8, 2008 | |
| INVENTOR(S) | : Francis E. Hayes | |

It is certified that error appears in the above-identified patent and that said Letters Patent is hereby corrected as shown below:

Column 2, line 43, "copes" should read --copies--;

Column 10, lines 1-2, "connected" should read --connection--; and

Column 11, line 29, "is match" should read --is a match--.

Signed and Sealed this

Twenty-sixth Day of May, 2009

JOHN DOLL
*Acting Director of the United States Patent and Trademark Office*